Sept. 25, 1945.  M. A. WHITING  2,385,669
CONTROL SYSTEM
Filed Jan. 27, 1944    3 Sheets-Sheet 1
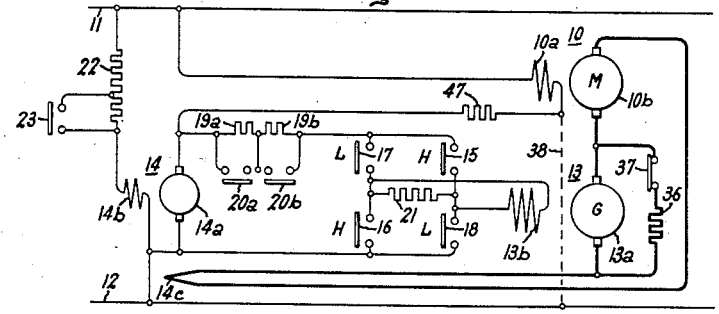
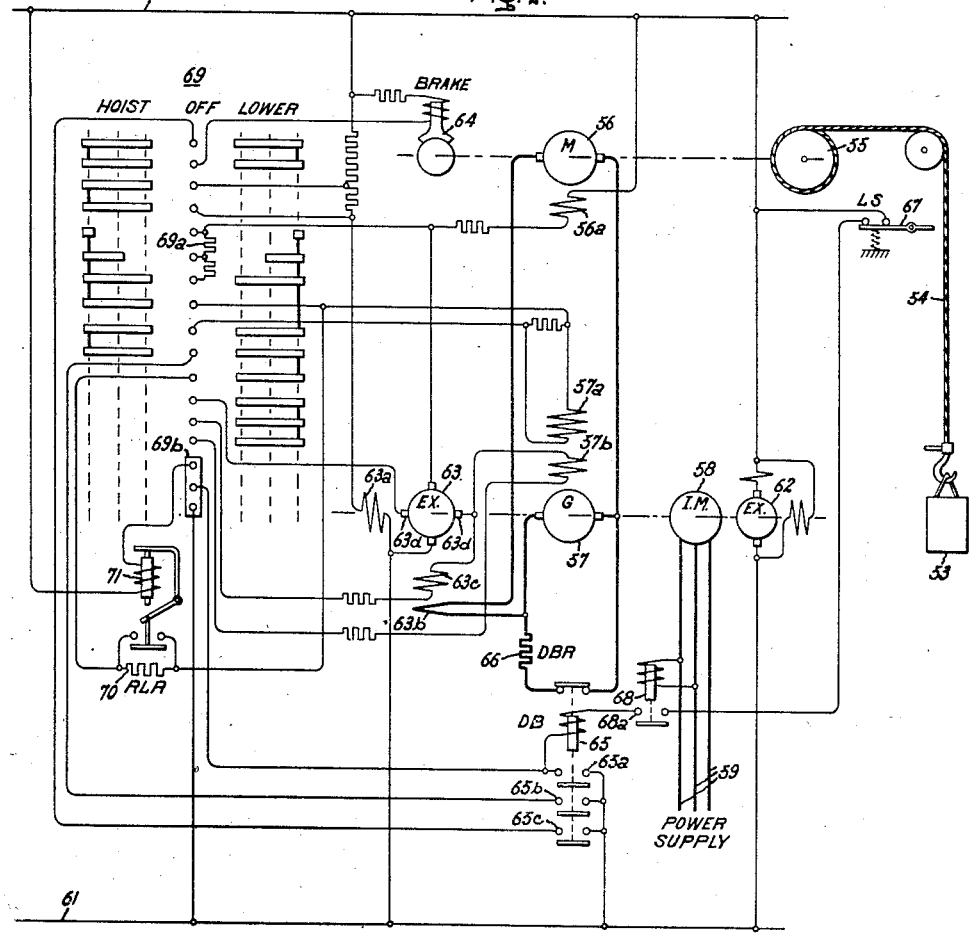
Inventor:
Max A. Whiting,
by Harry E. Dunham
His Attorney.

Sept. 25, 1945. M. A. WHITING 2,385,669
CONTROL SYSTEM
Filed Jan. 27, 1944 3 Sheets-Sheet 2
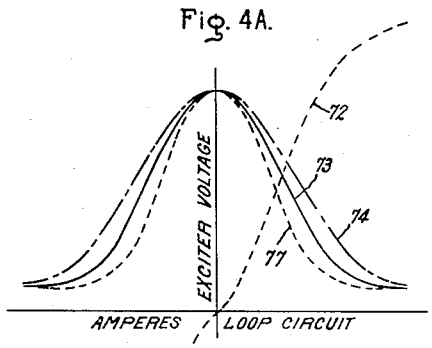
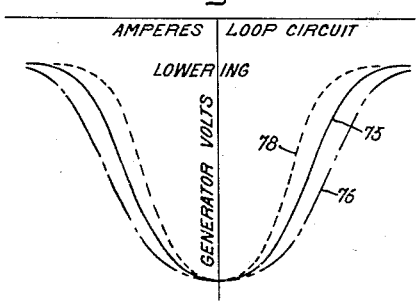
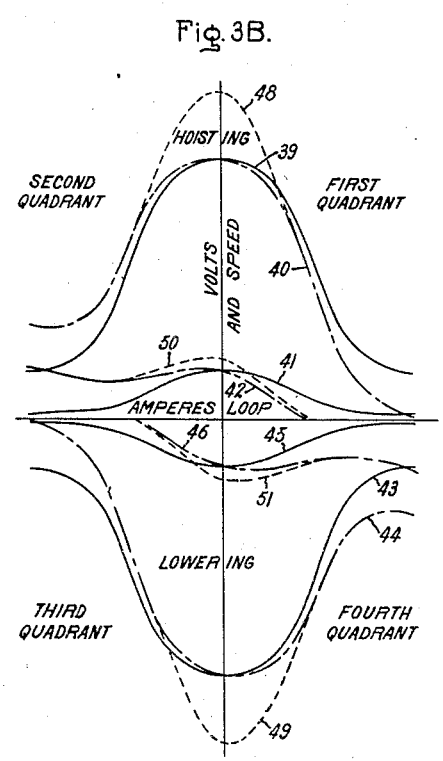
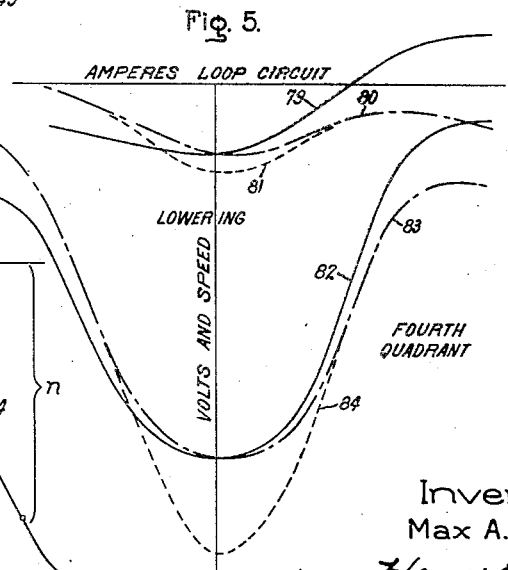
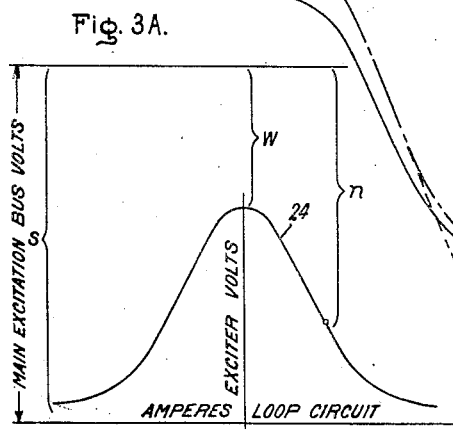
Inventor:
Max A. Whiting,
by Harry E. Dunham
His Attorney.

Inventor:
Max A. Whiting,
by Harry E. Dunham
His Attorney.

Patented Sept. 25, 1945

2,385,669

UNITED STATES PATENT OFFICE 2,385,669

CONTROL SYSTEM

Max A. Whiting, Schenectady, N. Y., assignor to General Electric Company, a corporation of New York Application January 27, 1944, Serial No. 519,929

14 Claims. (Cl. 172—152)

This invention relates to control systems, more particularly to control systems for electric motors, and it has for an object the provision of a simple, reliable, and improved control system of this character.

More specifically, the invention relates to motor control systems in which the motor is subject to overhauling loads, such for example as in hoisting systems. A more specific object of the invention is the provision of a motor control system in which the maximum speed of overhauling by a substantial load is inherently less than the maximum light load or no load speed, and in which the maximum speed of overhauling by the heaviest load is inherently less than the maximum speed of overhauling by a partial load.

Another object of the invention is to provide in a motor control system having the foregoing characteristics for overhauling loads, that the maximum speed of driving a heavy load shall be inherently less than the speed of driving a light load or no load. Also, it is an object of the invention that when driving a load, the motor shall stall at a predetermined overload.

It is a further object of the invention to provide in a motor control system that the motor field shall be inherently weakened at zero armature current and shall be progressively stronger at progressively greater armature currents for both motoring an overhauling loads and for both polarities of armature currents.

In carrying the invention into effect in one form thereof, the field of the motor is connected to a source of substantially constant D.-C. voltage. Means are provided for supplying a voltage to the armature of the motor. For varying the excitation of the motor to effect operation at a speed that varies in inverse relationship to the load, for both motoring and overhauling loads, means responsive to the armature current of the motor are provided which produce an excitation control voltage that varies in inverse relationship to the armature current for both polarities of armature current. This voltage is supplied in the field circuit of the motor so as to oppose the constant voltage of the source.

In one typical form, the invention is employed in a Ward-Leonard system.

In illustrating the invention in one form thereof, it is shown as embodied in a hoisting system.

Figure 6:
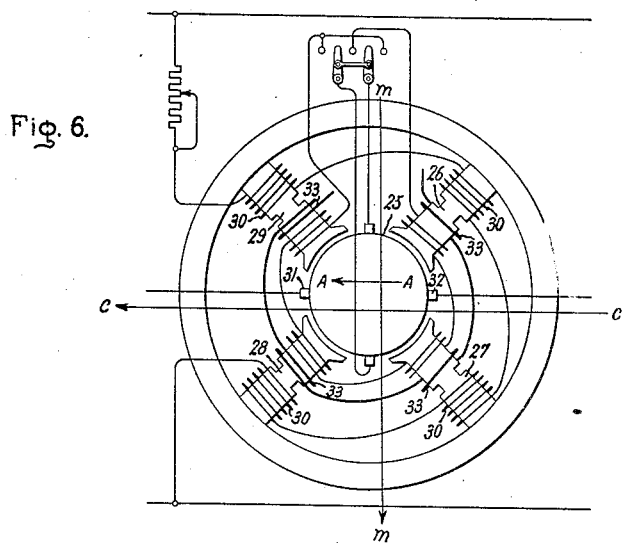
Figure 7A:
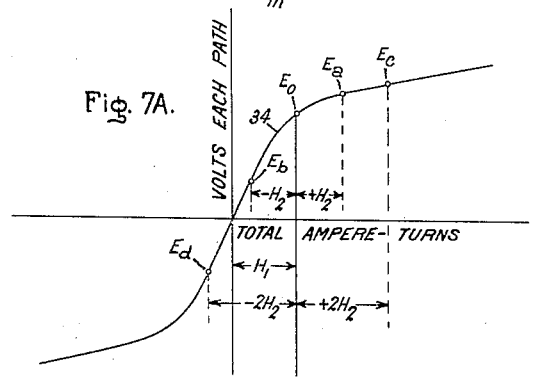
Figure 7B:
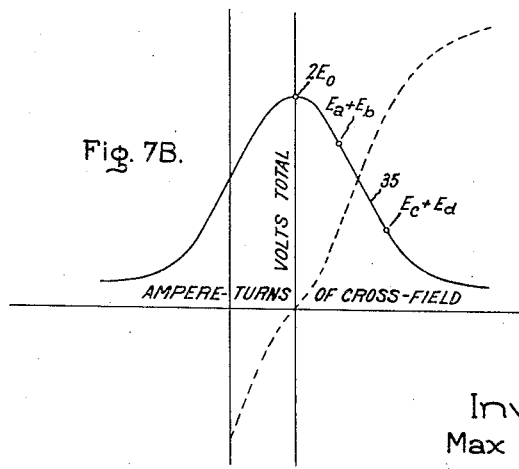

For a better and more complete understanding of the invention, reference should now be had to the following specification and to the accompanying drawings of which Fig. 1 is a simple, symbolic sketch of an embodiment of the invention, Fig. 2 is a simple, diagrammatical sketch illustrating a typical embodiment of the invention in a hoisting system, Figs. 3A, 3B, 4A, 4B, and 5 are charts of characteristic curves which facilitate an understanding of the invention, Fig. 6 is a structural sketch of an exciter dynamoelectric machine which is employed in the illustrated embodiment of the invention, and Figs. 7A and 7B are charts of characteristic curves which facilitate an understanding of the performance of the exciter dynamo-electric machine of Fig. 6. The dynamo-electric illustrated in Fig. 6 is described and claimed in my copending application, Serial Number 523,048, filed February 19, 1944, and assigned to the assignee of this application.

Referring now to Fig. 1, the hoist motor 10 has a separately excited field winding 10a. This field winding is supplied from a suitable source of substantially constant D.-C. voltage such as represented by the excitation busses 11, 12.

The armature 10b of the motor 10 is supplied from an adjustable voltage generator 13, and to this end the armature 13a of the generator and the armature 10b of the motor are connected in a loop circuit. The generator 13 is driven at a speed which is preferably substantially constant by any suitable driving means such as an induction motor (not shown). The generator 13 is provided with a separately excited field winding 13b which is supplied from an exciter 14, to the armature 14a of which the field winding 13 is connected through the directional contacts 15, 16, 17, and 18 and the speed controlling variable resistor 19a, 19b. The contacts 15 and 16 provide for rotation of the motor in the hoisting direction, and similarly, the contacts 17 and 18 provide for rotation of the motor in the lowering direction. For the purpose of inserting or short-circuiting the resistor sections 19a, 19b, contacts 20a and 20b are provided. Although a greater number of steps of variable resistor will usually be preferred in practice, two steps are sufficient for illustration.

It is preferred to use a discharge resistor 21 connected permanently across the generator field 13b. To be of substantial benefit, the ohmic resistance of resistor 21 should not have too high a value. Good results will be obtained if the value of the resistor 21 is between one and one-fourth and twice the hot resistance of the field winding 13b.

The armature 14a of the exciter 14 is also connected in series relationship with the field winding 10a of the motor, of a polarity such as to oppose the voltage of the excitation source 11, 12.

The exciter dynamo-electric machine 14 is provided with a separately excited field winding 14b which is excited from the substantially constant voltage excitation busses 11, 12. In addition, the exciter 14 is provided with an auxiliary field winding 14c which is connected in the loop circuit in series with the armatures 13a and 10b of the generator 13 and the motor 10, respectively. The separately excited field winding 14b is preferably wound for not more than one-fourth the main excitation bus voltage, the remaining three-fourths of the excitation bus voltage being absorbed by the resistor 22. Preferably, resistor 22 is made of a material whose resistance is substantially constant over a wide range of temperature. Thus the current in the field winding 14b is only slightly changed by changes in the temperature of the winding 14b. A further reason for the foregoing proportioning of the winding 14b is the elimination of oscillations. If the time constant of the winding 14b were only slightly less than that of the generator field winding 13b, the interaction of the rates of response might tend to cause oscillations. By winding the winding 14b for a low fraction of the excitation bus voltage, the time constant of exciter 14 is reduced to a negligible value.

The provision of a contact 23 for short-circuiting or inserting a portion of the resistor 22 is an optional modification.

In order that the motor 10 shall operate at a speed that varies generally in inverse relationship to the load, both for motoring and overhauling loads, the exciter 14 is constructed to have a terminal voltage characteristic such as illustrated by the curve 24 of Fig. 3A of which ordinates represent terminal volts, and abscissae represent the current flowing through the armature 10b of the motor in the loop circuit. This characteristic may be produced by means other than an exciter, such for example as electric valve means. It may also be produced by exciters having a different construction from that of the exciter illustrated in the drawings. One form of an exciter for producing the characteristic illustrated in Fig. 3A is shown in Fig. 6. The simplest form of this machine comprises a bipolar armature 25 and four pole pieces 26, 27, 28, and 29. If the armature is multipolar, the number of pole pieces will be twice the number of armature poles. As illustrated in Fig. 6, in which the bipolar armature is used, each field pole is divided into two pole pieces, sufficiently separated so that field windings may intervene at four approximately equal intervals about the field structure, and, furthermore, so that magnetic leakage between the tips of adjacent pole pieces shall not be excessive. Except where stated to be otherwise, the pole pieces and associated elements of the magnetic circuit are to be considered as substantially duplicates. A degree of artificial saturation of the pole pieces is usually provided. In Fig. 6 this is indicated by the notches in the pole pieces.

The pole pieces of Fig. 6 have two essential sets of windings, of which the winding 30 is separately excited from a substantially constant source. It is the winding which is denoted 14B in Fig. 1. The winding 30 is so arranged that its excitation is of one polarity, for example "north" upon the two upper pole pieces 26 and 29, and of the opposite polarity, i. e., "south" upon the two lower pole pieces 27 and 28. The general direction of this excitation is that of the arrow m—m, which is designated as the main field axis. Usually, but not necessarily, the winding 30 will have an equal number of turns upon all pole pieces.

The brushes 31 and 32 are the main output brushes of the machine. The brush positions indicated in the drawings are the commutating positions of the armature conductors and are not the actual spatial location of the brushes relatively to the pole pieces.

Upon the same pole pieces which carry the winding 30, a second exciting winding 33 is mounted. The coils of the winding 33 are so placed and connected that if they alone were excited, the two right-hand pole pieces 26 and 27 would both have the same polarity; for example, "north" and two left-hand pole pieces 28 and 29 would have the opposite polarity, i. e., "south." The direction of the magneto force developed by the winding 33 is that of the arrow c—c which is denoted the cross field axis. The winding 33 is referred to as the cross field. The excitation produced by the cross field is variable and reversible. Typically, the field winding 33 consists of a few turns and carries a relatively large current. Usually this winding will have equal numbers of turns upon all of the pole pieces.

For the polarities of currents illustrated in Fig. 6, the polarities of the main field winding 30 and the cross field winding 33 are additive on the upper right-hand pole piece 26 and lower left-hand pole piece 28. A substantial fraction of the total magnetic reluctance is in the air gap. By construction, a large part of the iron reluctance, particularly at high excitation, is in the pole pieces which, as pointed out in the foregoing, will usually be made of restricted cross section. Therefore it is approximately correct to consider the magnetic flux through pole pieces 26 and 28 as occupying a path which is independent of the flux path through the pole pieces 27 and 29. This flux path through the pole pieces 26 and 28 is referred to as path No. 1.

For the polarities of currents shown, the polarities of field windings 30 and 33 are in opposition upon the pole pieces 27 and 29. It is substantially correct to consider the magnetic flux through the pole pieces 27 and 29 as occupying an independent path which is referred to as path No. 2.

Arrow A—A in Fig. 6 indicates the direction of armature reaction.

In explaining the characteristics of the exciter, it is assumed that the armature IR drop and armature reaction are negligible, as for example when no load is connected to the armature or when these factors are counteracted or compensated by suitable means.

In Fig. 7A, the no load magnetization curve of each of the two flux paths is represented by the curve 34. The ampere turns produced by the separately excited field winding 30 are represented by H1, and the volts which are generated as a result of the ampere turns of one flux path are represented by Eo. When the cross field 33 is unexcited, the total voltage generated in the main axis is 2Eo as illustrated in Fig. 7B. When the cross field 33 is excited to the degree represented by H2, this excitation upon the pole pieces 26 and 28 adds to the original excitation H1 as indicated in Fig. 7A by +H2. In the flux path No. 1 this leads to an increase of generated voltage from the original value Eo to a value Ea. In pole pieces 27 and 29, this excitation by the cross field winding 33 opposes the excitation H1 as indicated in Fig. 7A by $-H2$. In flux path No. 2 this leads to a reduction in generated voltage from the original value $Eo$ to the value $Eb$. Because of increasing saturation in path No. 1, the increase in voltage from $Eo$ to $Ea$ is relatively small but because of decreasing saturation in path No. 2, the decrease of voltage from $Eo$ to $Eb$ is larger. Hence the total voltage now generated, which is the sum of the voltages $Ea$ and $Eb$, is less than the original value of $2Eo$. The voltage $Ea+Eb$ is illustrated in Fig. 7B.

If the cross field excitation is increased to a value of $2H2$, the voltage generated by flux path No. 1 undergoes only a slight increase from $Ea$ to $Ec$, owing to increasing saturation. However, flux path No. 2 becomes substantially unsaturated, and accordingly the voltage generated by flux path No. 2 undergoes a large decrease. In fact, it reverses from the value $Eb$ to the value $Ed$. The total voltage, which is the sum of $Ec$ and $Ed$, is therefore greatly reduced as indicated by the point $Ec+Ed$ in Fig. 7B. Thus, for the foregoing polarity of excitation of the cross field, the characteristic of voltage generated versus cross field current is similar to that portion of the curve 35 on the right-hand side of the zero axis in Fig. 7B. In other words, the voltage varies generally in inverse relationship to the cross field excitation.

One of the novel features of the invention appears when a reversal of the polarity of the current in the cross field is considered. Under this condition, the voltage generated by the flux in path No. 2 increases but its increase is limited by increasing saturation, in the same manner and to substantially the same extent as previously described for path No. 1. Conversely, the voltage now generated by the flux in path No. 1 decreases and its decrease is augmented by decreasing saturation in the same manner and to substantially the same extent as previously described for path No. 2. Thus, the total voltage generated decreases in a like manner as before, and the characteristic of voltage generated for ampere turns of the cross field tends to be symmetrical about the zero axis as illustrated in Fig. 7B.

The separate excitation of field 30 which is represented by H1 in Fig. 7A may appropriately be supplied at a substantially greater or substantially smaller value than illustrated in Fig. 7A. The resulting characteristics will be similar, in general, to those of Fig. 7A but of course different in their specific value. If the excitation H1 of the separately excited field winding is increased, the voltage generated in the main axis, i. e., at the brushes of the exciter, will have a higher maximum and will be higher at each value of cross field than in Fig. 7A. Conversely, at an excitation of field 30 which is less than that represented by H1, the maximum main axis voltage will be less and the voltage at each value of cross field will be less than illustrated in Fig. 7B. It will be observed that the characteristic represented by the curve 24 of Fig. 3a is identical with that represented by the curve 35 of Fig. 7A. Since the field winding 14c of Fig. 1 which is in quadrature relation with the field winding 14b corresponds to the cross field winding 33 of Fig. 6, the manner in which the characteristic represented by curve 24 is produced will be understood from the foregoing.

For the purpose of aiding in the retardation of the hoisting system by means of dynamic braking in the event of certain emergency conditions, a dynamic braking resistor 36 is provided. The completion of a dynamic braking circuit through the dynamic braking resistor 36 is controlled by means of a contactor 37. It will be noted that no means is illustrated for disconnecting the hoist motor 10 from the generator 13 when the dynamic braking circuit is closed. It is preferred not to use such disconnecting means in order to obtain certain advantages.

In explaining the operation of the system of Fig. 1, two alternative connections will be considered. In the first alternative, the exciter 14 merely supplies the excitation for the generator field winding 13b and is not connected in series relationship with the motor field winding 10a. On the contrary, the motor field winding 10a is connected directly across the excitation supply busses 11, 12 as indicated by the dotted line 38.

As indicated by the curve 24 of Fig. 3a, the voltage of the exciter 14 is substantially at its maximum when the current in the loop circuit is zero, and its voltage decreases with an increase of loop current, i. e., it varies generally in inverse relationship to the loop current.

When the system is in readiness for the initiation of the operation, the contacts 37 are opened at the "off" position of the master switch (not shown) by the action of means shown in Fig. 2 and described thereinafter. Thus dynamic braking resistor 36 is ineffective during all normal conditions of operation.

The movement of the master switch from the "off" position to the full speed hoisting position is represented in Fig. 1 by the closure of the hoisting directional contactors 15 and 16. Thus the generator field is connected to the armature terminals of the exciter 14, and the generator voltage begins to rise. The ensuing current in the loop circuit quickly reduces the voltage of the exciter from its maximum. If there is no hoisting load on the motor, the current in the loop circuit, after its first rise, decreases as the acceleration proceeds and finally, is reduced almost to zero. Thus the voltage of the exciter 14 eventually rises to almost its maximum. Accordingly, the generator voltage and the hoisting speed also rise substantially to their maximum values. However, if there is a substantial load on the hoist motor 10, the loop current continues at a substantial value and the voltage of the exciter 14 remains at substantially less than its maximum; hence, the voltage generated within the generator is at substantially less than its maximum. In the steady state, i. e., when not accelerating or retarding, the voltage generated by the generator at various loads is approximately as represented by the solid line curve 39 in the first quadrant of Fig. 3b. Owing to the armature IR drop of the loop circuit, the countervoltage of the motor 10 at various loads is approximately as represented by the dot-dash line curve 40 in the first quadrant. Owing to the constant excitation of the motor 10, as assumed, the curve 40 also represents substantially the motor speed.

In the usual case, the characteristics of the generator illustrated in the second quadrant of Fig. 3B are present only when a relatively small load on the motor is being hoisted and then only during a quick retardation. Under such a condition, the rate of decline of generator voltage may occur at a faster rate than the rate of decline of the hoist motor countervoltage, which would ensue by reason of the retardation resulting solely from the load. Under this condition, the loop circuit current becomes regenerative, and the performance of the motor and generator are illustrated by those portions of the curves 39 and 40 on the left-hand side of the zero axis.

At the lowest speed hoisting position of the master switch the contacts 20a and 20b being open, the characteristic of the exciter is substantially unchanged but because of the resistors 19a and 19b in circuit with the generator field, the generator field current is correspondingly reduced. The generator voltage characteristic is approximately that of the solid line curve 41, and the motor countervoltage is approximately that represented by the dot-dash line curve 42.

At the full speed master switch position in the lowering direction, the contacts 17 and 18 are closed and the contacts 15 and 16 are open. The exciter voltage has the same characteristic and polarity as before but the generator field is connected to the exciter in the direction opposite to that for the hoisting direction. Accordingly the voltage generated within the generator after the acceleration is finished, has substantially the characteristic represented by the solid line curve 43 in the lower half of Fig. 3B. At no load on the motor, the loop current will be little more than zero, hence the voltage of the exciter will be at substantially its maximum. Consequently, the generator voltage and the motor speed will be approximately at their maximum values. At a substantial load on the motor 10, the loop current will be of a substantial regenerative value. Owing to the reversal of the generator polarity and the nonreversibility of the hoist motor field, these regenerative lowering currents are in the same direction as the hoisting currents. Hence, at the various values of loop current for lowering regeneratively, the generator voltage characteristic is similar to that shown by the solid line 43 in the fourth quadrant of Fig. 3B. The motor IR drop is now of additive effect so that the motor countervoltage in the lowering direction is similar to that represented by the dot-dash line 44. For the first alternative of constant excitation of the field of the motor 10, the curve 44 also represents the motor speed.

At the lowest speed lowering position of the master switch, the generator voltage characteristic is approximately that of the solid line curve 45 and the motor countervoltage, and therefore its speed, is represented by the dot-dash line 46.

During certain accelerations in the lowering direction whose rates are faster than provided solely by the pull of the load, the performance of the system is in accordance with the characteristics illustrated in the third quadrant of Fig. 3B. If the mechanical efficiency of the hoist system is not very high, and if the weight of the hook is negligible, a small amount of motor output from the hoist motor may be required to rotate the hoist gearing and drum for a continuance of lowering of the empty hook. In this case, the loop circuit current will be in the third quadrant slightly to the left of the vertical axis of Fig. 3B. If the mechanical efficiency of the hoist is very high, and if the weight of the empty hook is very low, the loop circuit current for continuing to lower the empty hook may be zero or may be in the fourth quadrant slightly to the right of the zero vertical axis.

The second alternative arrangement and the one which is usually preferred is that in which the motor field instead of being constantly excited, is variably excited in the manner illustrated in Fig. 1. In this modification, the motor field is not connected to the lower main excitation bus in the manner illustrated by the dotted line 38 but instead it is connected to the upper terminal of the exciter 14 through a resistor 47 by means of which a moderate degree of adjustment of the resistance of the motor field circuit is provided. In this modification, the lower terminal of the exciter 14 is connected to the lower side 12 of the main excitation bus. The armature of the exciter is wound for a maximum voltage which is substantially less than that of the main excitation bus, typically about 60 per cent of the excitation voltage, and the generator field is wound accordingly. The polarity of the exciter is arranged to oppose the polarity of the main excitation bus. Thus, the hoist motor field is excited by the difference between the substantially constant voltage of the excitation bus and the variable voltage of the exciter. The motor field winding 10a and the resistor 47 are so proportioned that the normal ampere turns are obtained at approximately the rated or normal armature current of motor 10, as shown by the bracket $n$ in Figure 3A in which the ordinate bracketed as $n$ indicates the voltage available for excitation of the motor field. By "normal ampere turns" is meant that number of ampere turns which would normally be provided at rated load in a motor of the same design but having its field wound for use in a conventional electric hoisting system. At zero motor armature current, the excitation of the motor field is substantially less than normal as indicated by the bracket $w$. At maximum motor armature current, the excitation of the motor field is substantially greater than normal as indicated by the bracket $s$.

Several advantages are obtained from this preferred modification. The weakening of the motor field at low values of armature current provides a moderately higher value of speed for hoisting an empty hook and for lowering an empty hook than is obtainable from the same maximum generator voltage at constant motor field. At the full speed position of the master switch, the modification of motor speed characteristic produced by the described modification of motor excitation is indicated by the dotted line curve 48 for the hoisting direction and by the dotted line curve 49 for the lowering direction. A further advantage is that at armature currents higher than normal, the strengthening of the motor field not only prevents the high armature reaction from depleting the magnetic flux of the motor but provides a slight increase in the flux above normal; hence, the margin of electromagnetic stability of the motor is increased over that of a system which provides no strengthening of the motor field at high armature currents. This latter advantage is most pronounced when lowering extremely heavy loads and retarding such descending loads to a standstill.

In the lowest speed position of the master switch, the described modification of the motor excitation produces a motor speed characteristic such as illustrated by the dotted curve 50 for the hoisting direction and the dotted curve 51 for the lowering direction.

A further advantage of this arrangement for variable excitation of the hoist motor relates to the magnitude of the motor field current at the "off" position of the master switch. A typical hoist motor, particularly if totally enclosed and not artificially ventilated, cannot continue at standstill indefinitely with normal current in its field without risk of excessive heating because of its loss of ventilation. In the described modification of motor excitation, when the hook is being lowered at a substantial speed and the master switch is thereupon moved quickly to the "off" position, a relatively large loop circuit current is regenerated from the hoist motor to the generator during the retardation. This decreases the voltage of the exciter which, in turn, increases the strength of the motor field. Thus a favorable condition for retardation is provided. As the retardation nears completion, and the loop current decreases accordingly, the voltage of the exciter rises and the motor field strength decreases. After the retardation is completed and while the motor is at standstill at the "off" position of the master switch, the exciter generates substantially its maximum volage, the hoist motor field is at substantially its minimum strength, and the heating of the field at standstill is reduced to well below its permissible maximum.

When the master switch is in the "off" position and the hoist is at standstill, the current flowing from the excitation busses 11, 12 through the motor field into the exciter armature is at a substantial value and the effective magnetic flux of the exciter is at its maximum. Consequently the exciter develops a motoring torque corresponding to a substantial fraction of its capacity. For this reason it is inadvisable to provide a driving means for the exciter which is distinct from all other driving means. It is preferred to connect the exciter directly to the shaft of the motor which drives the generator 13. Optionally, the main exciter which supplies the excitation bus 11, 12 and the exciter 14 may be coupled together and driven from the motor generator or by a separate motor. When the two exciters are coupled together the motoring action of exciter 14 cannot cause it to run away, since the power which under some conditions is regenerated into the exciter 14 comes from the main exciter.

The operating means and conditions which cause the emergency dynamic braking resistor to become effective are illustrated in Fig. 2 and explained in connection therewith. However, certain principles involved can be understood by reference to Figs. 1 and 3A. Control circuit contacts (not shown) are so arranged that, upon the occurrence of an emergency condition in connection with which the dynamic braking circuit is intended to afford protection, the contactor 37 closes and the contactors 15 and 16, or the contactors 17 and 18 (whichever pair is in the closed position) are opened simultaneously. Also, the hoist brake (not shown in Fig. 1) is applied automatically. During the dynamic braking period, the loop circuit between the motor armature and the generator armature is not open. Upon closure of the contactor 37, current from the motor passes through the resistor 36. According to the momentarily existing conditions, a moderate amount of additional current from the motor may pass to the generator, or current from the generator may pass through the resistor 36 to add to that from the motor. In either event, the total current of the motor passes through the cross field winding 14c of the exciter 14. Thus, during an emergency retardation by dynamic braking, the voltage of the exciter continues to be substantially less than maximum to a degree corresponding to the magnitude of the motor armature current. Thus the emergency dynamic braking retardation is benefited by a strong motor field. By avoiding opening the loop circuit under any circumstances, the possibility is eliminated of a difficulty such as would occur if the loop circuit were accidentally open and failed to close when the master switch was moved to handle a load. Favorable dynamic braking characteristics are obtained from the described arrangement as a result of the following factors: (1) Owing to the inherently slower speed, the kinetic energy of the system when lowering loads is less than at the much higher speeds of light loads; (2) the initial value of generator field is much less, hence, its initial rate of decrease is much less, and its total time to decrease substantially to the zero is somewhat less; (3) the motor field is initially stronger so that the torque per ampere is greater; (4) the initial motor speed and motor voltage are less whereby motor commutation is favored.

The contact 23 illustrated in Fig. 1 is an optional addition which it is preferred to use for some embodiments, particularly for large equipments and for those in which the most highly improved characteristics are important. In one useful embodiment, the contact 23 is closed in only the hoisting direction of the master switch. The part of the resistor 22 which is short-circuited by the contact 23 is usually less than one-half the total. The separate excitation of exciter 14 by the separately excited field winding 14b is therefore moderately greater in the hoisting direction than at standstill or during lowering. Thus at each value of loop circuit current while lowering, the exciter voltage is moderately less than at an equal motor armature current in the hoisting direction. Also, at the "off" position of the master switch, the exciter voltage is moderately less than at the hoisting of the empty hook. Thus, at each value of motor armature current in the lowering direction, the generator voltage will be moderately less and the motor field will be moderately stronger than at the corresponding motor armature current in the hoisting direction, thereby providing an increased margin for stable and dependable operation in the lowering direction.

In the embodiment illustrated in Fig. 2, a load 53 is slung on the hoist hook which is attached to a rope 54 that is wound upon the hoisting drum 55 by the hoist motor 56. The motor 56 is supplied from an adjustable voltage generator 57 to the armature of which the armature of the motor is connected in a series loop circuit.

The generator 57 is driven by any suitable driving means such as the induction motor 58 which is supplied from a suitable polyphase source such as represented by the three conductors 59. A substantially constant voltage is supplied to the main excitation busses 60, 61 by means of a suitable main exciter 62 which is driven by the induction motor 58. For controlling the excitation of the generator field winding 57a and the motor field winding 56a, a cross flux exciter 63 is provided. This exciter corresponds to the exciter 14 of Fig. 1. Also included in the modification of Fig. 2 are a conventional, separately excited magnetic brake 64 upon the hoist motor shaft together with a contactor 65 for controlling the dynamic braking resistor 66, and a limit switch device 67, and an under voltage relay 68 for controlling the operation of the dynamic braking contactor 65. The speed and direction of rotation of the hoist motor 56 are controlled by suitable means such as the multi-position reversing type master switch 69 and the variable resistor 69a controlled thereby. The speed varying resistor 69a is included in the circuit of the main generator field winding 57a. It corresponds to the speed varying resistor 19a, 19b of Fig. 1 and is illustrated as having but two resistance steps. A resistor having a larger number of steps is usually employed in practice.

In addition to the main field winding 57a, the adjustable voltage generator 57 is provided with an auxiliary field winding 57b. Likewise the cross flux exciter 63 in addition to its main separately excited field winding 63a and its cross field winding 63b connected in the loop circuit of the motor and generator armatures is provided with an additional auxiliary field winding 63c which is connected across a pair of brushes 63d which are arranged on the cross axis, i. e., an axis in quadrature with the main brush axis. The additional field winding 57b of the generator 57 is supplied from the cross axis brushes 63d of the cross flux exciter 63. If the field 63c and the brushes 63d are considered absent from the exciter 63 and the auxiliary field winding 57b is considered absent from the supply generator 57, the modification of Fig. 2 is equivalent to the modification of Fig. 1. Accordingly, the normal operation of the equipment will be understood by tracing the circuits of Fig. 2 and referring to the illustration and description of Figs. 1 and 3A and 3B.

The emergency dynamic braking contactor 65 may appropriately be controlled by a number of devices, depending upon the specific local conditions. In Fig. 2 two such devices are illustrated. The relay 68 closes its contacts and maintains them closed when the alternating supply voltage is not seriously below the normal value. In series with the contacts of relay 68 are the contacts of the overhoist limit switch 67 which, as shown, is operated by the hook movement at a position a little below the highest proper position of the hook. If the A.-C. power source fails, the opening of the contacts 68a deenergizes the magnet coil of contactor 65 and causes contactor 65 to drop out and close its main contacts thereby to connect the dynamic braking resistor 66 across the motor armature. In the event of an overhoist, the opening of limit switch 67 similarly causes the dynamic braking contactor to drop out. In such an event, it is necessary to by-pass the limit switch 67 by means of a temporary connection in order to pick up the dynamic braking contactor 65 to provide for resumption of operation. Other emergency contacts (not shown) may be added, if preferred, in series with the contacts 67 and 68a, such for example as overspeed switches on the shaft of the motor generator 58, 57, and on the hoist drum 55.

For a safe and satisfactory automatic retardation in the event of an emergency condition, such as overwind, failure of incoming power and the like, it is important that the generator excitation be discontinued automatically and that the hoist brake be set automatically. If the master switch is left or moved to a running position while the hoist is idle following an emergency stop or a failure of incoming power, the reclosure of all emergency contacts such as 67 and 68a and the resumption of incoming power must not be allowed to start the hoist immediately. In the modification of Fig. 2, the control is contrived so that for the resumption of operation, the master switch must be at or must be moved to the "off" position before the equipment can respond to the master switch in the running position. These three requirements are taken care of by the three auxiliary contacts 65a, 65b, and 65c of the dynamic braking contactor 65 in a manner which will readily be understood by tracing the circuits. Briefly, once the dynamic braking contactor 65 has dropped out and the solenoid brake 64 has set, the dynamic braking contactor cannot be picked up nor the solenoid brake 64 energized to release the brake until the master switch 69 has been moved to the "off" position to complete energizing circuits for the operating coil of the dynamic braking contactor 65 through the "off" position segment 69b of the master switch.

When a substantial load on the hook is held at standstill at the "off" position of the master switch and when the master switch is then moved abruptly to the full speed lowering position, the speed may rise momentarily substantially beyond the steady state value which it eventually attains. This transient overspeed is substantially or entirely eliminated by means of a resistor 70 in circuit with the main field winding 57a of the generator 57, together with a control relay 71 which is under the control of the master switch 69. The relay 71 is preferably of a type which picks up without delay when its operating coil is energized but whose dropout is delayed so as to occur approximately one second after its coil is deenergized. For this relay it is preferred to use a well-known type in which the delay of the dropout is caused by eddy currents in its unlaminated magnet frame or in a thick copper jacket about its magnet core.

It will be noted that in the "off" position of the master switch, the relay 71 is picked up. When the master switch is moved to a running position, the operating coil is deenergized and after a delay of approximately one second, according to adjustment, the relay drops out. During this one second delay, the resistor 70 is maintained in circuit in series between the generator field 57a and the exciter 63. This resistor is preferably of a resistance somewhat greater than the remainder of the generator field circuit at the full speed position of the master switch. After being at standstill at the "off" position of the master switch, when the master switch is moved abruptly to the full speed lowering position, resistor 70, being in circuit, causes the acceleration to begin at only about one-half the rate that would otherwise occur, and to progress toward a maximum corresponding to only a little more than one-half of the maximum voltage which would otherwise occur. Owing to the reduced rate of acceleration, the loop circuit current very quickly attains a substantial value in the normal regenerative direction and the voltage of the exciter 63 quickly decreases. By the time the relay 71 drops out and short-circuits the resistor 70, the loop circuit current has reached nearly the regenerative value corresponding to the load on the hook and the voltage of the exciter 63 has decreased to a corresponding degree. When the resistor 70 is short-circuited, the generator voltage rises smoothly to the value corresponding to this reduced voltage of exciter 63 and the speed of the motor comes to its proper value with little or no transient excess.

For movement of the master switch from the "off" position to a hoisting position, there is, in the usual case, no reason for the resistor 70 to be effective. In the Fig. 2 modification the resistor 70 is effective in the lowering direction only, since, in the hoisting position of the master switch 69, the generator field circuit bypasses the resistor 70. If it is desired to make the resistor 70 effective in the hoisting direction, this can be done by a simple rearrangement which will be evident from the arrangement used for the lowering direction.

A further advantage of the invention is that no time limit relays, lockout magnets, or similar devices of the prior art are necessary in order to restrict the rapidity of change of generator field in order to prevent the occurrence of abusive overload currents when the master switch is moved abruptly from the full speed lowering position to the full speed hoisting position. The retardation and reversal of movement of heavy descending loads is greatly favored and rendered easier by the characteristics of the system. At loads of substantial magnitude the momentary maximum current required for the most rapid reversal from full lowering to full hoisting speed is substantially no greater than that for the fastest retardation of an equal load from full lowering speed to standstill. The heavier the load on the hook, and accordingly, the heavier the regenerated current when lowering this load, the smaller is the additional component of current required for retarding the descending load to standstill or for reversing it to the hoisting direction.

A modification which may be useful under certain conditions is illustrated in Fig. 2 and described in the following. For some embodiments it may be desired to provide that at the same loop circuit current, the cross field of the exciter 63 shall be stronger at certain master switch positions than at others, for example, stronger in the hoisting than in the lowering direction, or conversely. For those cases in which it is desired to modify the strength of the cross field in response to the master switch position, the additional winding 63c on the exciter 63 is used. It is excited by the voltage between the brushes 63d. The polarity relations of the winding 63c may be either always additive, always subtractive, additive for master switch positions in one direction, subtractive in the other direction. Alternatively, the winding 63c may be effective for master switch positions in one direction and ineffective in the other direction. Furthermore, different values of resistance may be arranged to be in series with the field winding 63c at the various positions of the master switch.

As illustrated in Fig. 4a, the voltage between the cross axis brushes 63d is approximately proportional to the current in the cross field winding 63c as indicated by the dotted line curve 72. Hence, the winding 63c when excited from the brushes 63d and connected to be effective in the cross field axis, has to a reasonable degree of approximation, the same effect as an increase or a decrease in the number of turns of the cross field winding 63b. By modifying the effectiveness of the winding 63c, the degree of the effectiveness of the total cross field can be readily modified and controlled. A limitation to be observed is that if the winding 63c, rather than the winding 63b is the preponderant cross field, the operation of the system is likely to become unsteady. Preferably, the ampere turns of winding 63c should not exceed one-third the ampere turns of the winding 63b at the same loop circuit current.

As shown in Fig. 2, the winding 63c is energized only in the lowering positions of the master switch. Consider the winding 63c to be connected to oppose the cross field winding 63b. Thus, in the lowering direction, the total cross field excitation at any substantial value of loop circuit current is less than it would be if the winding 63c were omitted. Accordingly, the characteristic of exciter 63, although unchanged in the hoisting direction, is changed for the lowering direction from its previous characteristic indicated by the solid line curve 73 of Fig. 4a to that indicated by the dot-dash line curve 74. The generator voltage characteristic is unchanged in the hoisting direction, but in the lowering direction it is changed from the previous characteristic represented by the solid line curve 75 in Fig. 4b to that represented by the dot-dash line curve 76. Accordingly, the speed of lowering a substantial load, although less than that of lowering the empty hook, is greater than would occur if the additional cross field winding 63c were omitted.

If the field winding 63c is connected for the opposite polarity from that just described so that it aids the cross field winding 63b, the characteristic of the exciter 63 at the lowering positions of the master switch is changed from that of the solid line curve 73 of Fig. 4A to the dotted line curve 77. Accordingly, the generator characteristic in the lowering direction is changed from that of the solid line curve 75 of Fig. 4B to that represented by the dotted line curve 78. Likewise, the speed of lowering a substantial load will be correspondingly less than it would be if the field winding 63c were not used in this manner.

There are cases in which it is advantageous to provide a small percentage of series field on the generator which shall be controllable according to the position of the master switch. This is accomplished by the addition of the field 57b to the supply generator which is excited from the cross axis brushes 63d of the exciter. The maximum effect of the auxiliary winding 57b is a relatively small percentage of the maximum effect of the main generator field winding 57a, e. g., approximately five per cent. Since the voltage between the brushes 63d is approximately proportional to the loop circuit current, the effect of the winding 57b is generally similar to that of a conventional series winding with, however, the significant practical difference that it can be controlled readily. The field winding 57b has a substantial resistance and requires only a very moderate maximum current, typically an ampere or less. Consequently, the field winding 57b, although in effect substantially a series field, can readily be controlled by contacts on the master switch.

When the exciter 63 is constructed with duplicate magnetic circuits and when its field windings 63a and 63b are duplicated upon all the pole pieces, the voltage generated within the exciter in its main axis never reaches zero. Consequently, in the simplest modification illustrated in Fig. 1, the generator excitation on any running position of the master switch and the corresponding voltage generated within the generator can never become as low as zero. In the lowering direction in such a modification, the IR drop in the loop circuit at heavy regenerative loads is of such magnitude that upon the lowest speed lowering of the master switch, the speed at maximum load on the hook may be equal to or even greater than the speed of the empty hook upon that master switch position. It is sometimes important that the minimum speed of lowering a heavy load shall be substantially lower than the minimum speed of lowering a partial load or empty hook.

In the modification of Fig. 3, the auxiliary generator field winding 57b is connected so as to be effective only in the lowering positions of the master switch, and of a polarity to oppose the main generator field winding 57a. At the lowest speed position of the master switch, the current flowing in the field winding 57a is low, and the generator is substantially unsaturated, so that the field winding 57b, although of relatively small cross-section, has a relatively large differential effect when fully excited as by the maximum cross brush voltage of the exciter. Thus, when lowering a load regeneratively on the lowest speed position of the master switch, the voltage generated within the generator has a characteristic similar to the solid line curve 79 in the fourth quadrant of Fig. 5 to the right of the vertical zero axis. As there shown, the generator voltage actually reverses at an intermediate load. The corresponding motor countervoltage is represented by the dot-dash line curve 80. The effect of the variable motor field is substantially the same as explained in the foregoing, thereby leading to a motor speed characteristic which is represented by the dotted line curve 81.

If the additional generator field winding 57b remains connected at all lowering positions, as illustrated in Fig. 2, it has a relatively smaller percentage effect at the full speed lowering position of the master switch as illustrated in Fig. 5 by the solid line curve 82 representing generator voltage, the dot-dash line curve 83 representing motor countervoltage, and the dotted line curve 84 representing motor speed.

Although the voltage across the brushes 63d tends to be zero when the equipment is at standstill, it may be somewhat different from zero. Thus, when the field winding 57a is used, it is important that it be disconnected from the brushes 63d at the "off" position of the master switch as is illustrated in Fig. 2.

If the characteristic tending to exist between lowering speed and amperes in the loop circuit is very steep, i. e., if the maximum speed of lowering full load tends to be too small a fraction of the maximum speed of lowering the empty hook and if other factors are sufficiently unfavorable, an oscillating or "hunting" condition is liable to occur in which the speed at which a load descends may have an undamped oscillating component. In other words, the speed may vary rapidly between two quite different values without any tendency to reach a uniform value. Other factors which contribute to this oscillating condition are: (1) too weak a minimum value of motor field; (2) kinetic stored energy of the entire hoist maximum too great in comparison with the capacity of the supply generator and hoist motor; (3) generator field circuit time constant $$\frac{L}{r}$$

too small. If a completed installation is found to exhibit this difficulty of hunting when lowering a load, the condition may be corrected by strengthening the minimum value of motor field or decreasing the steepness of the characteristic of generator voltage with respect to loop circuit current in the lowering direction; or it may be advisable to do both. The steepness of the generator voltage-current characteristic may be effectively reduced by means of an auxiliary shunt type field winding on the cross flux exciter, such as the field winding 63c which is arranged to be effective in the cross field axis. This auxiliary field winding 63c is excited from the cross axis brushes 63d and the segments and fingers of the master switch 69 are so arranged that the field winding 63c is excited only in the lowering direction as explained in the foregoing.

Although in accordance with the provisions of the patent statutes this invention is described as embodied in concrete form and the principle thereof has been explained, together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent of the United States, is:

1. A control system for an electric motor provided with a field winding comprising means for supplying a voltage to the armature of said motor, means responsive to the armature current of said motor for producing an excitation control voltage for said field winding that varies in inverse relationship to said armature current for either polarity of said current thereby to effect operation of said motor at a speed that varies inversely with the load for motoring and overhauling loads.

2. A motor control system comprising in combination an electric motor provided with a field winding, a source of excitation for said field winding, means for supplying a voltage to the armature of said motor comprising an adjustable voltage generator provided with a field winding, and means responsive to the armature current of said motor for producing an excitation voltage for said generator field winding that varies in inverse relationship to said armature current for either polarity of said current thereby to effect operation of said motor at a speed that varies in inverse relationship to the load for both motoring and overhauling loads.

3. A control system comprising in combination, a substantially constant source of voltage, an electric motor having a field winding supplied from said source, means for supplying a voltage to the armature of said motor comprising an adjustable voltage generator provided with a field winding, means responsive to the armature current of said motor for producing an excitation control voltage that varies in inverse relationship to said armature current for either polarity of said current, and connections for supplying said voltage between said motor field and said source to oppose the voltage of said source and connections for supplying said voltage to said generator field thereby to effect operation of said motor at a speed that varies in inverse relationship to said armature current for motoring and overhauling loads.

4. A control system comprising in combination, a source of substantially constant voltage, an electric motor provided with a field winding connected to said source, means for supplying a voltage to the armature of said motor comprising an adjustable voltage generator provided with a field winding and having its armature connected in a loop circuit with the armature of said motor, means responsive to the armature current of said motor for producing an excitation control voltage that varies in inverse relationship to said current for either polarity of said current, connections for supplying said excitation control voltage in circuit between said motor field winding and said source to oppose the voltage of said source and connections for supplying said voltage to said generator field winding thereby to effect operation of said motor at a speed that varies in inverse relationship to the load for motoring and overhauling loads, a dynamic braking resistor, and means responsive to an emergency operating condition of said system for connecting said dynamic braking resistor in parallel with the armatures of said generator and motor while maintaining said loop circuit intact.

5. A control system comprising in combination a substantially constant source of voltage, an electric motor provided with a field winding connected to said source, means for suplying a voltage to the armature of said motor comprising an adjustable voltage generator provided with a field winding, and means for varying the excitation of said field windings to effect operation of said motor at a speed that varies in inverse relationship to load for motoring and overhauling loads comprising an exciter dynamo electric machine having its armature connected to supply said generator field winding and also having its armature connected between said motor field winging and said source to oppose said source, said exciter having a main separately excited field winding and an auxiliary field winding excited by the armature current of said motor for producing a flux at an angle with the flux produced by said main field winding thereby to cause the output voltage of said exciter to vary in inverse relationship to said armature current for both polarities of said current.

6. A motor control system for hoists and the like in which the motor is subject to overhauling loads comprising a source of substantially constant voltage, an electric motor having a field winding connected to said source, means for supplying a voltage to the armature of said motor comprising an adjustable voltage generator provided with a field winding, means responsive to the armature current of said motor for producing excitation control voltages for said field windings that vary in inverse relationship to said current, connections for supplying said control voltage to said motor field circuit to oppose the voltage of said source and connections for supplying said voltages to said generator field winding thereby to effect operation of said motor at a speed that varies in inverse relationship to the load, a reversing type master switch in the connections to said generator field winding for completing said generator field connections and controlling the direction of rotation of said motor, a resistor included in said generator field connections for limiting the initial rate of rise of generator voltage, a time delay device responsive to operation of said master switch for the direction in which said motor is subject to overhauling loads for rendering said resistor ineffective a predetermined interval of time after operation of said master switch to complete said generator field connections.

7. A control system for an electric motor comprising in combination, a source of supply for the armature of said motor, means for controlling the excitation of said motor to effect operation thereof at a speed which varies in inverse relationship to the load comprising an exciter dynamoelectric machine having a main field winding and an auxiliary field winding excited by the armature current of said motor and arranged to produce a flux at an angle with the flux produced by said main winding.

8. A control system for an electric motor comprising in combination, means for supplying current to the armature of said motor, and means for controlling the excitation of said motor field winding to effect operation of said motor at a speed which varies in inverse relationship to the load for both motoring and overhauling loads comprising an exciter dynamoelectric machine having a main separately excited field winding and an auxiliary field winding excited by the armature current of said motor and arranged to produce a flux in quadrature with the flux of said main field winding whereby to vary the output voltage of said exciter in inverse relationship to said armature current for both polarities of said current.

9. A control system for an electric motor comprising in combination, a source of constant voltage, an electric motor provided with a field winding connected to said source, means for supplying a voltage to the armature of said motor, and means for controlling the excitation of said motor to effect operation of said motor at a speed that varies in inverse relationship to the load for motoring and overhauling loads comprising an exciter dynamoelectric machine having its armature connected in circuit with said motor field winding to oppose the voltage of said source and provided with a main separately excited field winding and an auxiliary field winding excited by the armature current of said motor for producing a flux in quadrature with the flux of said main field winding thereby to produce an excitation control voltage that varies in inverse relationship to said motor armature current for either polarity of said current.

10. A control system comprising in combination an electric motor, means for supplying a voltage to the armature of said motor comprising an adjustable voltage generator provided with a field winding, and means for controlling the excitation of said field winding to effect operation of said motor at a speed which decreases with increasing load for motoring and overhauling loads comprising an exciter dynamoelectric machine provided with a separately excited field winding and an auxiliary field winding excited by the armature current of said motor and arranged to produce a flux in quadrature with the flux produced by said main field winding thereby to vary the output voltage of said exciter machine in inverse relationship to the armature current of said motor for either polarity of said current.

11. A control system for an electric motor provided with a field winding, comprising in combination means for supplying a voltage to the armature of said motor comprising an adjustable voltage generator provided with a field winding, and means for varying the excitation of said motor and generator field windings to effect operation of said motor at a speed which decreases with increasing load for both motoring and overhauling loads comprising an exciter dynamoelectric machine provided with a main separately excited field winding and an auxiliary field winding excited by the armature current of said motor and arranged to produce a flux in quadrature with the flux produced by said main field winding thereby to vary the output voltage of said exciter in inverse relationship to the armature current of said motor for either polarity of said current.

12. A control system comprising in combination, an electric motor provided with a field winding, means for supplying a voltage to the armature of said motor, means for controlling the excitation of said field winding to effect operation of said motor at a speed that varies in inverse relationship to the load for motoring and overhauling loads comprising a D.-C. dynamoelectric machine having two pairs of pole pieces, one pair on either side of the brush axis, a main winding for exciting the poles of one pair for the same polarity and the other pair for opposite polarity, and an auxiliary winding excited by the armature current of said motor arranged on said pole pieces to act cumulatively with the main windings on two diametrically opposite pole pieces and substractively on the other two pole pieces for one polarity of said armature current thereby to produce a voltage at the brushes of said machine that varies in inverse relationship to the armature current of said motor for either polarity of said current.

13. A control system comprising in combination, an electric motor provided with a field winding, means for supplying a voltage to the armature of said motor, means for varying the excitation of said field winding to effect operation of said motor at a speed that varies in inverse relationship to the load for motoring and overhauling loads comprising a dynamoelectric machine having a bi-polar armature, two pole pieces on one side of the brush axis and two pole pieces on the other side of said axis, a separately excited main field winding for magnetizing the pole pieces on one side of said axis to one polarity and the pole pieces on the other side to the opposite polarity and magnetizing all of said pole pieces to a substantial degree of saturation, and an auxiliary winding excited by the armature current of said motor and arranged to act cumulatively with the main windings on the two poles on opposite sides of said axis and differentially on the other two poles thereby to produce an output voltage that varies in inverse relationship to said motor armature current for either polarity of said current.

14. A control system comprising in combination, a source of substantially constant voltage, an electric motor having a field winding connected to said source, means for supplying a voltage to the armature of said motor comprising a variable voltage generator provided with a field winding, means for varying the excitations of both said field windings to effect operation of said motor at a speed that varies in inverse relationship to load for motoring loads and overhauling loads comprising a dynamoelectric machine having its armature connected between said motor field winding and said source to oppose the voltage of said source and having connections to said generator field winding, said exciter having a bi-polar armature and four pole pieces two on each side of the brush axis, a main separately excited field winding for magnetizing the pole pieces on one side of said brush axis to one polarity and those on the other side to the opposite polarity and magnetizing all of said pole pieces to a substantial degree of saturation, and an auxiliary winding on said pole pieces excited by the armature current of said motor for acting cumulatively with said main winding on two diametrically opposite poles on opposite sides of said brush axis and differentially with the main windings on the other two pole pieces thereby to cause said exciter to generate a voltage that varies in inverse relationship to said armature current for either polarity of said current.

MAX A. WHITING.

CERTIFICATE OF CORRECTION.

Patent No. 2,385,669.

September 25, 1945.

MAX A WHITING.

It is hereby certified that error appears in the printed specification of the above numbered patent requiring correction as follows: Page 1, first column, line 30, for "an" after "motoring" read --and--; page 3, second column, line 30, for "thereinafter" read --herinafter--; page 4, second column, line 26, for "Figure" read --Fig.--; page 7, second column, line 59, for "duplicated" read --duplicate--; line 75, for "reavy" read --heavy--; page 9, first column, line 19, for "suplying" read --supplying--; line 30, for "winging" read --winding--; and second column, line 17, for "whereby" read --thereby--; and that the said Letters Patent should be read with this correction therein that the same may conform to the record of the case in the Patent Office.

Signed and sealed this 29th day of January, A. D. 1946.

Leslie Frazer (Seal)

First Assistant Commissioner of Patents.